(12) United States Patent
Rourke

(10) Patent No.: US 7,796,889 B1
(45) Date of Patent: Sep. 14, 2010

(54) SYSTEM AND METHOD FOR CONTROLLING DIVERSE INFRARED CONTROLLED DEVICES

(75) Inventor: Michael C. Rourke, Groton, MA (US)

(73) Assignee: Quartet Technology, Inc, Dracut, MA (US)

( * ) Notice: Subject to any disclaimer, the term of this patent is extended or adjusted under 35 U.S.C. 154(b) by 649 days.

(21) Appl. No.: 11/068,440

(22) Filed: Feb. 28, 2005

(51) Int. Cl.
H04B 10/00 (2006.01)
(52) U.S. Cl. ...................................................... 398/106
(58) Field of Classification Search ............... 348/14.05, 348/211.99, 734; 398/106, 107, 111, 112, 398/126
See application file for complete search history.

(56) References Cited

U.S. PATENT DOCUMENTS

| 4,856,081 | A | * | 8/1989 | Smith | 455/151.4 |
| 5,282,028 | A | * | 1/1994 | Johnson et al. | 725/139 |
| 5,452,345 | A | * | 9/1995 | Zhou et al. | 379/124 |
| 5,635,938 | A | * | 6/1997 | Komoto | 341/200 |
| 6,097,520 | A | * | 8/2000 | Kadnier | 398/106 |
| 6,384,737 | B1 | * | 5/2002 | Hsu et al. | 340/825.69 |
| 6,522,262 | B1 | * | 2/2003 | Hayes et al. | 340/825.69 |
| 6,546,474 | B1 | * | 4/2003 | Weigelt | 711/162 |
| 2005/0165609 | A1 | * | 7/2005 | Zuberec et al. | 704/270 |

OTHER PUBLICATIONS

"Encyclopedia of Graphics File Formats", Second Edition, by J. Murray et al., O'Reilly, 1996, Chapter 9.3.*

* cited by examiner

Primary Examiner—Quan-Zhen Wang

(57) ABSTRACT

A system for controlling diverse infrared controlled devices, capable of emulating infrared signals provided by diverse infrared remote controls by recording them, and then using information derived from the recorded signals to reproduce the signals. A received infrared signal is sampled, stored, edge trimmed and compressed into a table of entries. Each entry indicates a level and a length of a portion of the associated infrared signal having that level. The compression also eliminates transients from the captured infrared signal. The table fully describes the captured infrared signal. A table header may contain the frequency at which the captured infrared signal was sampled, and the number of table entries used to describe the signal. During playback, a file containing the table for a user selected infrared signal may be opened and read into a dynamic memory. The vector table header information may be used to determine the number of stored vector table entries, and to determine the sampling rate at which the associated infrared signal was captured. An infrared shift register in specialized hardware shifts out one bit of data every sampling cycle until each bit of data described by each entry in the vector table has been transmitted. The disclosed system may be conveniently embodied to be voice controlled, to enable voice control over all infrared remote controlled devices in a disabled user's living environment.

4 Claims, 5 Drawing Sheets

US 7,796,889 B1

SYSTEM AND METHOD FOR CONTROLLING DIVERSE INFRARED CONTROLLED DEVICES

FIELD OF THE INVENTION

The present invention relates generally to controlling infrared controlled devices, and more specifically to a system and method for learning and controlling diverse infrared controlled devices using an infrared vector compression technique.

BACKGROUND OF THE INVENTION

The infrared remote control is ubiquitous in daily life, controlling a wide variety of systems and devices. Infrared remote controls are provided with many modern devices, such as audio or video components. As a result, in even moderately complex systems, like home theater entertainment systems, the total number of remote controls used to separately control all the devices involved can quickly grow to an unmanageable size. For example, even in a relatively simple system, a user may have separate remote controls for a TV, a VCR, a DVD player, an amplifier, a CD player, and a cable control box. To address this complexity, a significant after-market has evolved in so called "universal" remote controls that perform the jobs of multiple specific remote controls. However, existing universal remote controls can only perform a limited subset of the functions that the device-specific remote controls they are intended to replace could accomplish. The user may thus be provided with a single remote control they can use most of the time, but still require multiple additional remote controls for occasional or regular use.

Compounding the limited utility of many existing universal remote controls is their inability to deal with a wide range of infrared frequencies. Most domestic U.S. infrared controlled devices operate using infrared frequencies in the 10 kHz to 125 kHz range, with some operating in the 455 kHz range. However, a small but significant percentage of U.S. devices operate outside of this range. Additionally, some European and Asian infrared controlled devices use other "out of range" frequencies. This situation causes problems with so called "learning" universal remote controls, since they cannot accurately learn infrared signals outside a typical expected frequency range.

To compound these problems, different infrared remote controls use different encoding schemes to transmit data to a controlled device. For example, some infrared remote controls use what is known as an RC5 code, which is a "Remote Control" code developed by Philips Electronics N.V., while others use an NRZ (Non-Return-to-Zero) type code, and still others use different proprietary codes. Thus a challenge also currently exists in correctly supporting different encoding formats.

Finally, the length of the required infrared signal can vary greatly between infrared controlled devices. Most infrared controlled devices require only a short burst of infrared signal, but there are some that require signals as long as two seconds.

The above and other issues make it difficult to build a single universal remote control that will work for all infrared controlled devices. However, there is a great need for a single infrared remote control that effectively operates with diverse controlled devices. This is especially true for situations where a user may be disabled in some way, and therefore unable to switch between multiple remote controls. For example, some users may need remote control capabilities provided under voice control, and/or under the control of one or more ability switches. Such ability switches may include sip and puff switches, tongue switches, blink switches, or other specific types of switches as required for a specific disabled person. In the case where an infrared remote control is voice or ability switch controlled, it should be able to fully operate all infrared remote controlled devices in the user's environment.

For the reasons stated above, in a complete solution, the following technical problems should be solved: i) the remote control should be able to handle any infrared signal frequency, ii) the remote control should be able to handle any type of encoding format, iii) the remote control should be able to handle any infrared signal length, and iv) the remote control should be able to conveniently handle large numbers of different infrared signals.

SUMMARY OF THE INVENTION

To address the above described and other deficiencies of the prior art, a system and method for controlling diverse infrared controlled devices is disclosed. The disclosed system can emulate the infrared signals provided by diverse infrared remote controls by recording the signals, and then using information derived from the recorded signals to reproduce the signals. Using a dynamically configured or pre-set sampling rate, a received infrared signal is sampled and stored in memory until an End Of Signal (EOS) is detected. The captured signal is then edge trimmed to decrease its size by removing any captured preceding and/or trailing zeros. The edge trimmed captured signal is then compressed into a table of entries, referred to herein for purposes of explanation as a "vector table". Each vector table entry consists of a pre-determined number of bits, including a pre-determined "level" bit indicating a level associated with the entry. The level for an entry may be either high (1) or low (0). The remaining bits are used to describe a signal portion length associated with the entry. The disclosed system determines a length value for each entry by counting the sample periods during which an associated portion of the captured infrared signal remained at either a continuous high or a continuous low level. When a level transition is detected in the captured infrared signal, a new vector table entry is generated. A disclosed compression step may be used to eliminate transients from the captured infrared signal. These transients are generally noise from the environment that can cause blips in the acquired data. Transients may, for example, be filtered out using a software algorithm if needed. Such an algorithm may operate to detect when a carrier includes a frequency component inconsistent with the average high and low times for the carrier, and to remove that inconsistent component. The result of the compression phase is a vector table of entries that fully describes the captured infrared signal.

A header may be formed for each vector table. Such a vector table header indicates a sampling frequency at which the corresponding infrared signal was sampled, and the number of vector table entries used to describe that signal. The header and associated vector table may be stored in a file system or the like.

During playback, a file containing the vector table for an infrared signal may be opened and read into a data storage component. The vector table header information is then read to determine the number of stored vector table entries, and to determine the sampling rate at which the associated infrared signal was sampled. The sampling rate may be used to set up specialized vector table processing hardware circuits to use a processing rate matching the rate at which the associated signal was sampled. A software process may also be used to load specialized infrared hardware circuits with data required for playback of the infrared signal. For example, an infrared signal shift register may be used to shift out one bit of data every sampling cycle. Such a process may continue until each bit of data described by each entry in the vector table has been transmitted in an output infrared signal. After the last vector table entry has been transmitted, the file for the vector table is closed and all associated dynamic memory is freed.

Thus there is disclosed a new system for controlling multiple, diverse infrared controlled devices. The disclosed system may be conveniently embodied in a voice or ability switch controlled system, to enable voice control over all infrared remote controlled devices in a disabled user's living environment. The disclosed system can advantageously: i) handle any infrared signal frequency, ii) handle any type of encoding format, iii) handle any infrared signal length, and iv) conveniently handle large numbers of different infrared signals.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
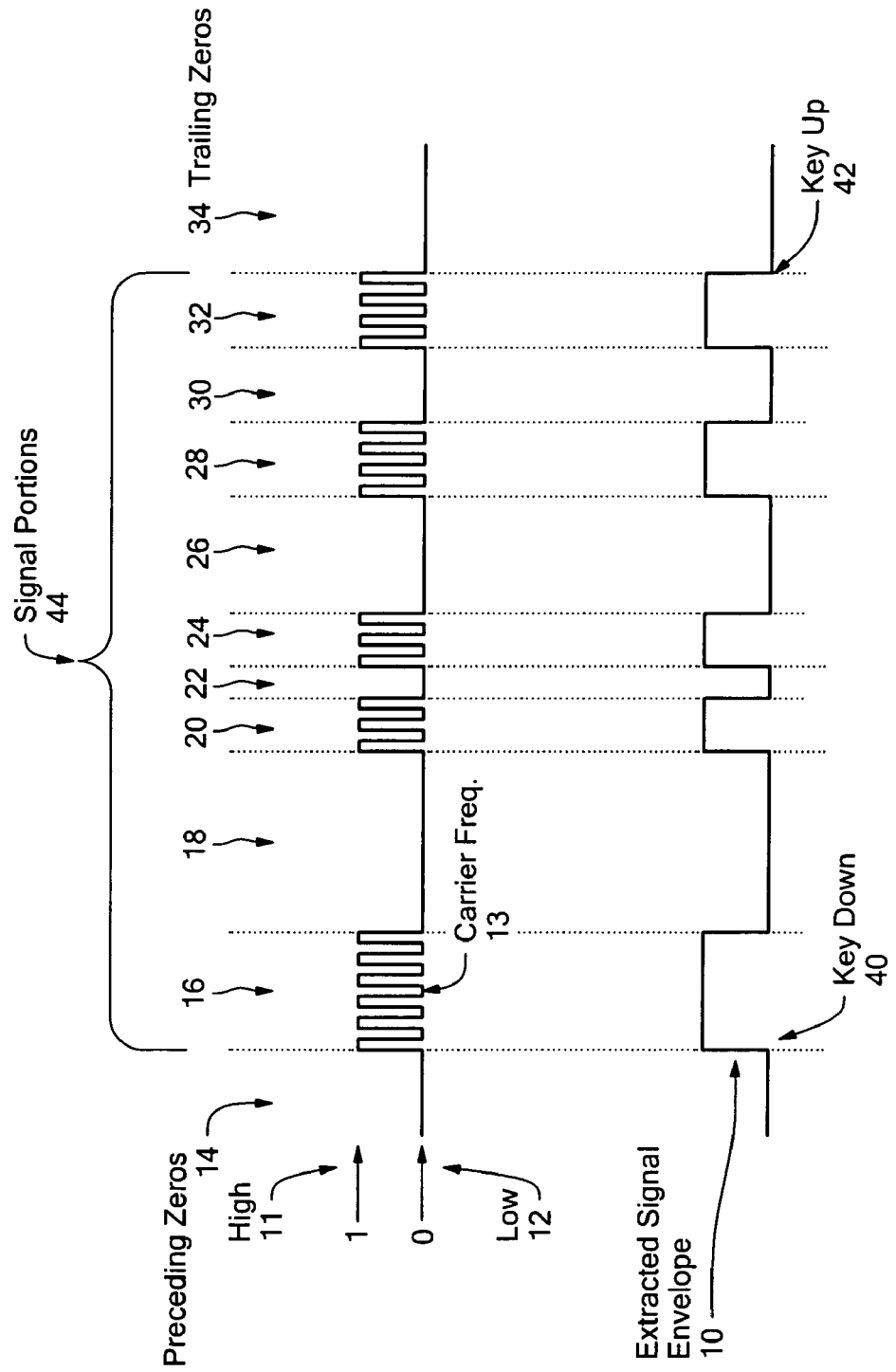
FIG. 1 is a signal diagram illustrating an infrared signal.

FIG. 1 illustrates an example of the general structure of an infrared signal that may be captured and then later reproduced for controlling an infrared controlled device using the disclosed system. As shown in FIG. 1, signal envelope 10 may vary between a high level 11 (logical 1) and a low level 12 (logical 0). In some cases, the signal envelope 10 may be defined by the presence or absence of a carrier frequency 13. A number of preceding zeros 14 are present prior to a key down event 40, which, for example corresponds to a user pressing down a button on an infrared remote control to initiate transmission of an infrared signal to be captured by the disclosed system.

A number of signal portions 44 follow the key down event 40, and are followed by a key up event 42, and then a number of trailing zeros 34. The key up event 42 may, for example, correspond to a user releasing a button on the infrared remote control to terminate transmission of the infrared signal that has been captured by the disclosed system. The signal portions 44 include high portions 16, 20, 24, 28 and 32, consisting of logical 1 values, as well as low portions 18, 22, 26, 30 consisting of logical 0 values.

Figure 2:
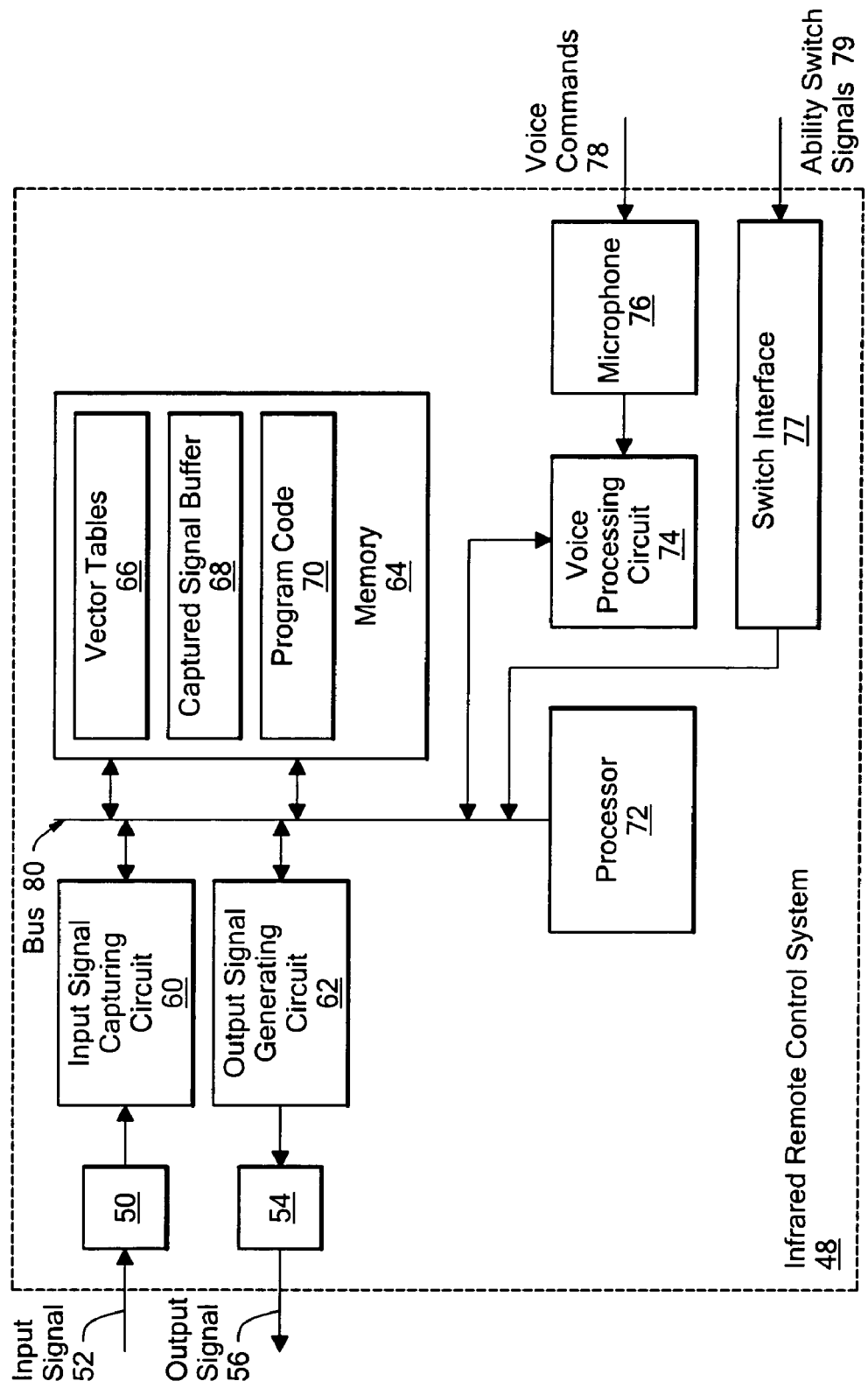
FIG. 2 is a block diagram showing logical blocks within an illustrative embodiment.

FIG. 2 illustrates an embodiment of the disclosed system. As shown in FIG. 2, an infrared remote control system 48 includes an infrared signal receiver 50 for receiving an input infrared signal 52, and an infrared signal transmitter 54 for transmitting an output infrared signal 56. The system 48 further includes an input signal capturing circuit 60, an output signal generating circuit 62, a memory 64, a processor 72, a voice processing circuit 74, a microphone 76 for receiving voice commands 78, and a switch interface 77 for receiving ability switch signals 79. The ability switch signals 79 may consist of any specific type of signal received from any specific type of ability switch enabling a disabled person to issue commands, such as sip and puff switches, tongue switches, blink switches, or other specific types of switches as required for a specific disabled person. The components of the system 48 may be communicably interconnected in any specific manner, for example by use of a communication bus 80. The memory 64 includes vector tables 66, a captured signal buffer 68, and program code 70 for execution on the processor 72.

During operation of the system 48 shown in FIG. 2, an input infrared signal 52 is captured and stored in raw form within the captured signal buffer 68. The raw, captured infrared signal is then converted into a vector table of entries stored in the vector tables 66. Upon conversion of the received infrared signal to its vector table representation, one embodiment of the disclosed system automatically creates the output signal 56 based on the stored vector table, so that the user can immediately determine if the input signal 52 has been correctly captured and stored for future use. If the automatically re-created signal fails to cause the associated action in the infrared controlled device, the user can re-attempt to load the input signal 52.

After the input signal 52 has been correctly captured and stored as a vector table, the system 48 can be used to recreate the input signal 52 as the output signal 56. For example, in response to a command of some kind, such as in response to receipt of a corresponding one of the voice commands 78 or ability switch signals 79, the original received infrared signal 52 is re-created as output signal 56, based on the associated vector table stored in the vector tables 68. Throughout operation of the system, 48, the program code 70 executes on the processor 72 in order to control at least portions of the operation of the disclosed control system 48 along with the other components shown in FIG. 2.

While the illustrative embodiment of FIG. 2 is shown for purposes of explanation having certain specific components, the present invention is not so limited. Accordingly, the present invention may be embodied in various alternative ways, having many different combinations and configurations of components. For example, while the input signal capturing circuit 60 and output signal generating circuit 62 are illustrated as separate logical blocks in FIG. 2, they may be embodied in more or less than two components. Similarly, the processor 72 is shown for purposes of convenience as a single logical block, but may actually be embodied using any specific number of components or individual processors. Also, while a single memory block 64 is shown in FIG. 2, those skilled in the art will recognize that various specific memories of potentially different types, sizes, and/or memory technologies may be used as needed for a given implementation of the disclosed system.

Figure 3:
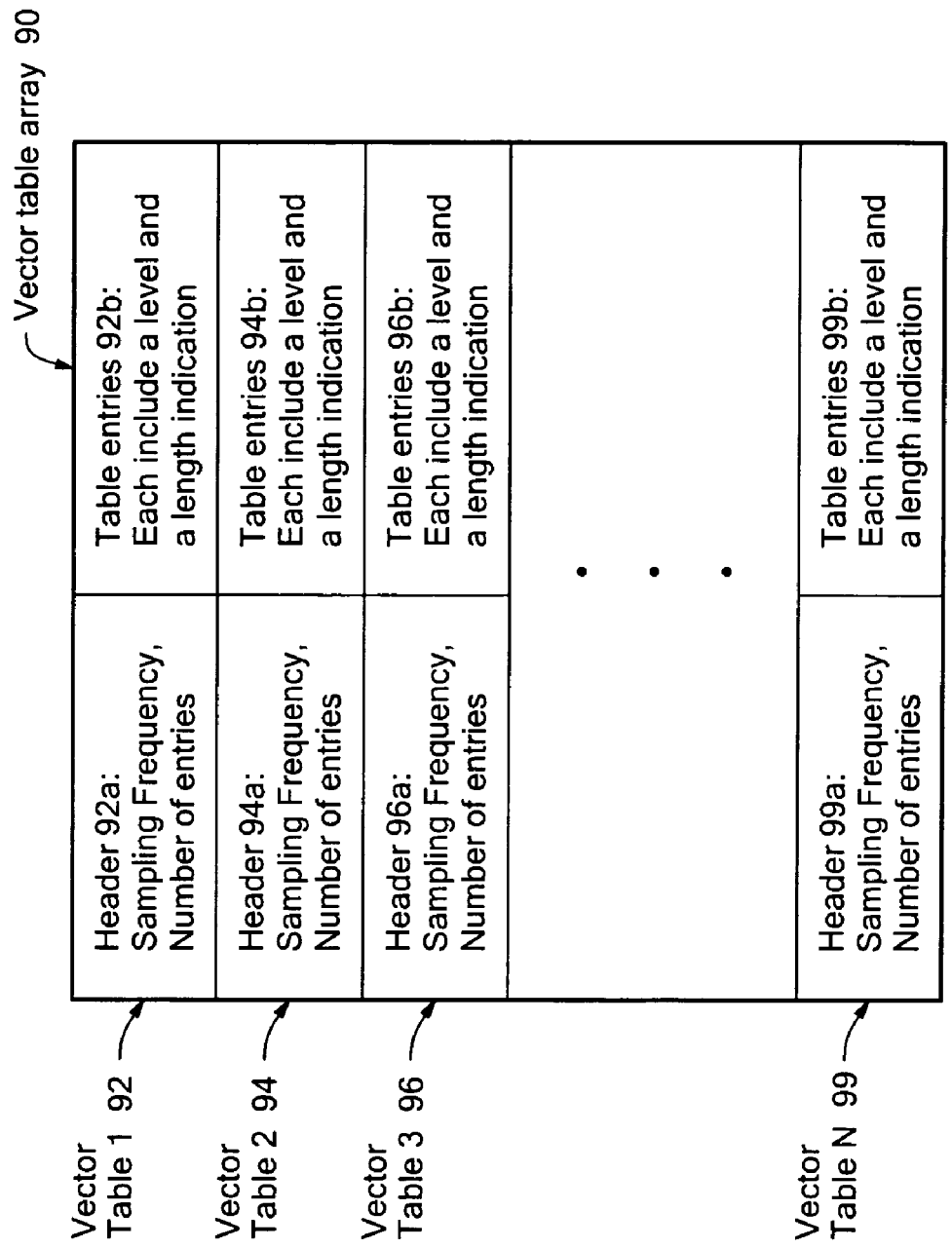
FIG. 3 shows an array of vector tables in an illustrative embodiment.

FIG. 3 shows an example of vector table array 90, such as may correspond to the vector tables 66 shown in FIG. 2. Each of the entries in the vector table array 90 consists of a vector table. Each of the vector tables includes a header portion, and some number of entries (also referred to as "vectors"). Each of the vector tables corresponds to a previously captured and converted input infrared signal that can be recreated by the disclosed system based on the information it stores. The infrared signals that can be captured and represented by the disclosed system may be of any specific type, as used to control any specific kind of infrared controlled device.

Specifically in FIG. 3, the vector table 1 92 includes a header 92a storing a sampling frequency and an indication of the number of entries in that vector table. Each of the table entries 92b include an indication of entry length and a level indication. Similarly, the header 94a for vector table 2 94 includes a sampling frequency and number of entries, and the table entries 94b each include a length and level, and so on for the vector table 3 96, and all other vector tables in the vector table array 90, up through some vector table N 99.

While the vector table array 90 shown in FIG. 3 is one way in which the infrared signal representation may be stored by the disclosed system, those skilled in the art will recognize that other specific structures may be used in the alternative, depending on the specific implementation.

Figure 4:
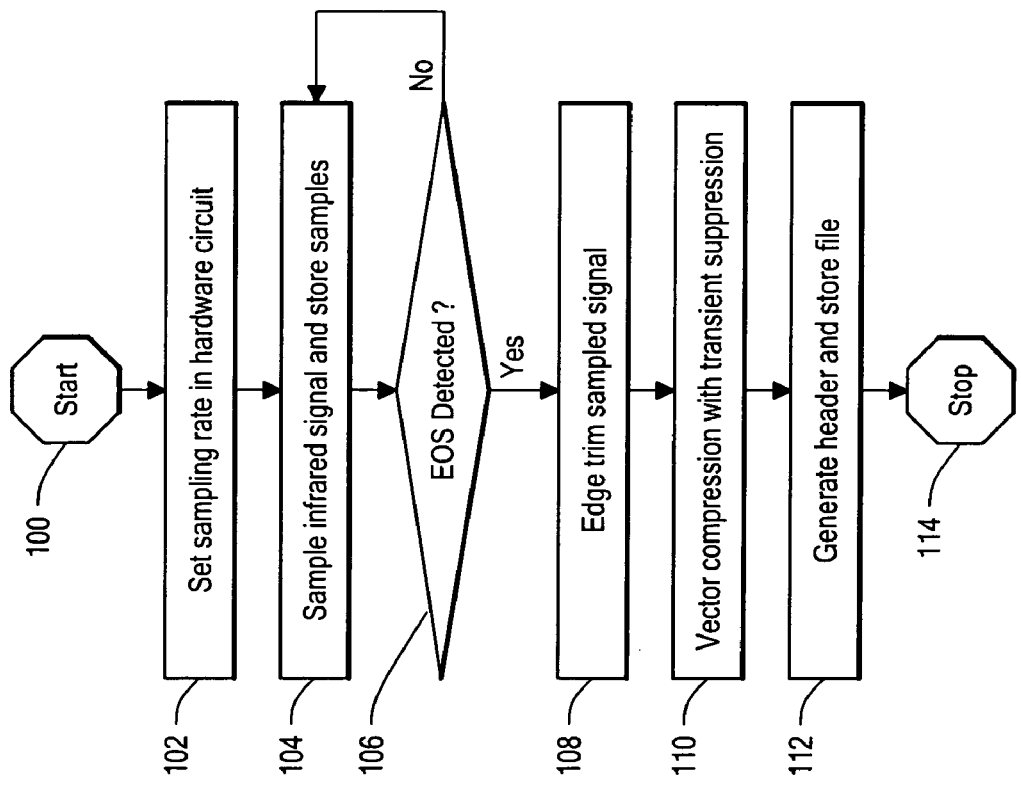
FIG. 4 is a flow chart showing steps performed during signal acquisition in an illustrative embodiment.

FIG. 4 is a flow chart illustrating steps performed to capture and store a representation of an input infrared signal in an embodiment of the disclosed system. The steps of FIG. 4 may, for example, be performed at least in part under control of instructions within the program code 70 shown in FIG. 2. The steps of FIG. 4 start at step 100, and include setting a sampling rate in a hardware circuit, such as in the input signal capturing circuit 60 shown in FIG. 2. For example, at a 1 MHz sampling rate, an input infrared signal of up to two 250 kHz can be reliably sampled, while at 5 MHz, an input signal of up to 1.25 MHz can be acquired. Other sampling rates may be used as appropriate.

At step 104, the input infrared signal is sampled and stored in a memory buffer until an End Of Signal (EOS) is detected at step 106. For example, EOS may be determined to be detected when there has been no active infrared signal for over some programmable time period, e.g. 500 ms. The input signal may be stored in raw form wholly or partly within a captured signal buffer 68, for subsequent compression to its vector table representation that is stored in the vector tables 66 as shown in FIG. 2.

Next, at step 108, the raw captured signal is edge trimmed to reduce its size. Such edge trimming may be used to eliminate any leading and/or trailing zeros from the captured input signal. Step 108 is possible due to the following two constants shared across the infrared signals processed by the disclosed system. The first such constant is that the first transition in such an infrared signal is low to high. The second constant is that the last transition is always high to low. Based on this structural commonality, the disclosed system operates to remove the preceding and trailing zeros from the captured signal to reduce its size.

At step 110, the disclosed system performs compression on the captured signal to generate the corresponding vector table of some number of entries. For example, each vector table entry within the vector table for the captured signal may consist of a fixed number of information bits, for example 32 bits. The most significant bit of an entry may be used to describe the a level associated with the entry. This level can be either high (1) or low (0). The remaining (31) bits of the entry are used to describe the length of a signal portion corresponding to the entry. This length may be determined by counting contiguous sample periods in which the corresponding infrared signal remains at the level for that entry. Accordingly, as the vector table is being generated in response to the received input signal, whenever a level transition is detected, a compression routine may create a new entry within the vector table being generated. This process performed at step 110 may also be used to eliminate transients from the input signal. Such transients are generally noise from the environment that can cause blips in the acquired data. For example, such blips may be filtered out using a software algorithm that operates to detect when a carrier includes a frequency component inconsistent with the average high and low times for the carrier, and to remove that inconsistent component. The end result of this processing step is a list of vector table entries that fully describe the input infrared signal.

At step 112, vector table header is generated for the compressed infrared signal. The header generated at step 112 contains the sampling frequency at which the infrared signal was sampled, along with the number of entries that describe the signal. In an exemplary embodiment, the header is then written, followed by the vector table entries, into a file within a file system provided by software operating in the disclosed system, after which the process stops at step 114.

Figure 5:
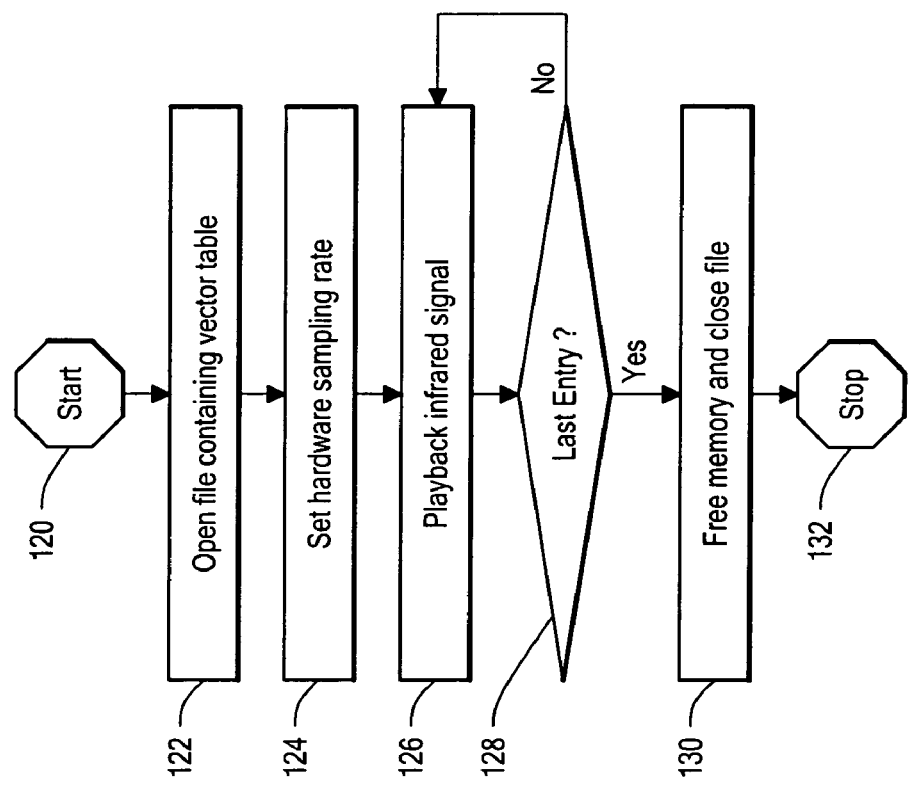
FIG. 5 is a flow chart showing steps performed during signal playback in an illustrative embodiment.

FIG. 5 illustrates steps performed by an embodiment of the disclosed system to playback an infrared signal that was previously captured and stored as a vector table. The process starts at step 120, for example in response to receipt of a voice command corresponding to the captured and stored infrared signal. Such voice commands may, for example, consist of words such as "power on", "channel up", "channel down", "volume up", "volume down", and/or any other specific voice command that may be associated with a stored infrared signal. At step 122, the disclosed system operates to open a file associated with the voice command that contains the associated vector table. At step 124, header information, such as the sampling rate for the vector table and the number of entries in the table, are read from the vector table header, and loaded into hardware circuitry that will assist in generating the output infrared signal. At step 126, the infrared signal is played back based on the information in the vector table entries, until the last entry is detected at step 128, after which the local data memory used to store the vector table while the output signal is being generated is freed. Also at step 128, any file opened to access the vector table may be closed. A specialized infrared hardware circuit may be used that includes an infrared data shift register operable to shift out one bit of data into that output signal every sampling cycle until all entries in the vector table has been processed.

Figure 6:
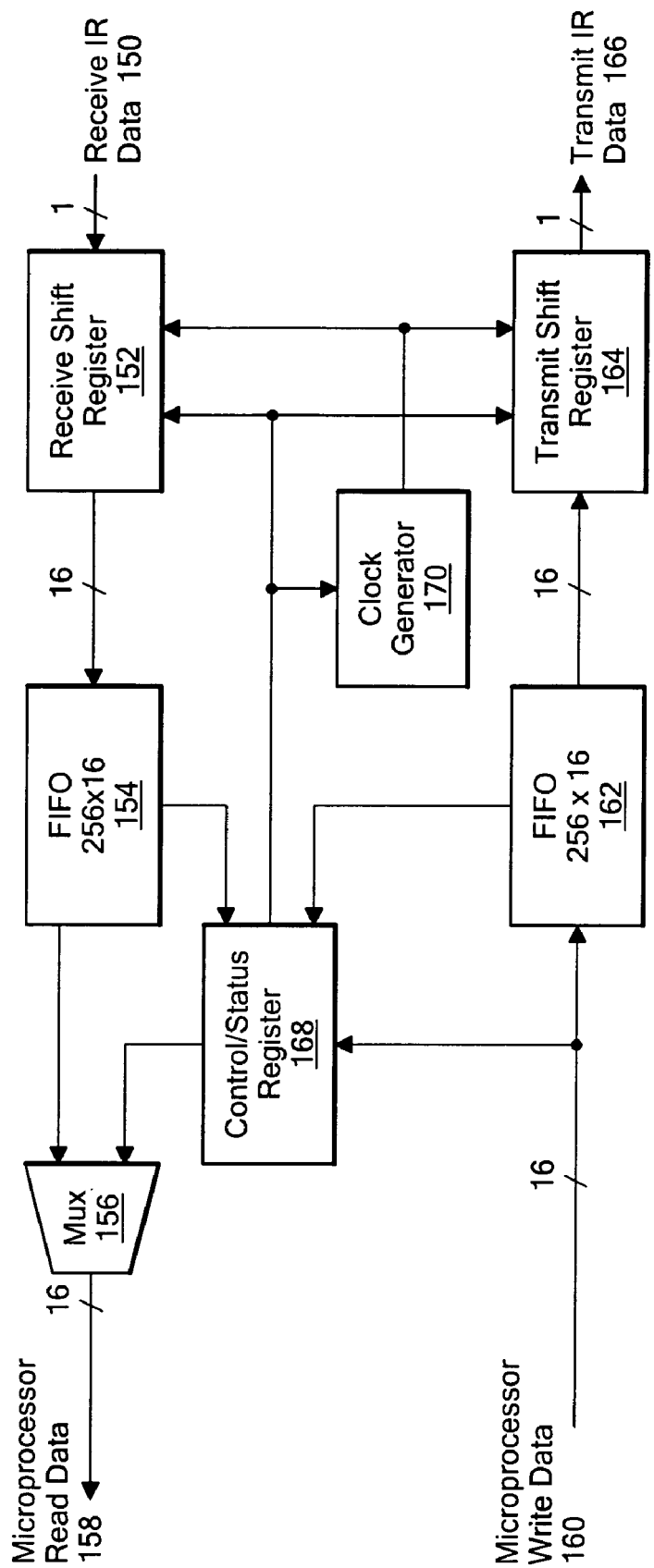
FIG. 6 shows one possible example of input signal capturing and output signal generating circuitry in an illustrative embodiment.

FIG. 6 shows one possible example of input signal capturing and output signal generating circuitry in an illustrative embodiment. As shown in FIG. 6, data 160 provided from a microprocessor is passed to a FIFO 162, and then to a transmit shift register 164, from which it is output as transmit IR data 166. Received IR data 150 is passed through a receive shift register 152, and then to a FIFO 154, and then through a multiplexer 156, which outputs data 158 which is read by the microprocessor.

The control status register 168 enables setting of a sampling frequency to be used in the clock generator 170. In order to read the control/status register 168, the output of the control/status register 168 is selected at the multiplexer 156 to be read by the microprocessor as read data 158. The control/status register 168 may be written through the write data 160 from the microprocessor.

The FIFO 154 functions as a data buffer to allow the microprocessor time to read and process received data. The FIFO 162 functions as a data buffer to allow the microprocessor to conveniently write output data. A line from the FIFO 154 provides an indication through the control/status register 168 that it is nearly full. A line from the FIFO 162 provides an indication through the control/status register 168 that it is nearly empty.

FIGS. 4-5 are block diagram and flowchart illustration of methods, apparatus(s) and computer program products according to an embodiment of the invention. It will be understood that each block of FIGS. 4-5, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures. Accordingly, the invention should not be viewed as limited except by the scope and spirit of the appended claims.

The invention claimed is:

1. A method for controlling diverse infrared controlled devices, comprising:

receiving an input infrared signal from at least one infrared remote control;

capturing and storing said input infrared signal in raw form by sampling said input infrared signal at a predetermined sample rate, and by storing a plurality of resulting sample values in a memory until an end of signal indication is detected;

compressing said sample values into a table, wherein said table includes a plurality of table entries, wherein each of said table entries includes a level indication and a length value, wherein said level indication comprises a single bit of each of said table entries and said length value comprises a plurality of remaining bits of each of said table entries, wherein said level indication indicates an associated signal level and said length value indicates a number of associated contiguous samples at said signal level within a corresponding portion of said input infrared signal, and wherein a first predetermined value of said level indication indicates a high signal level and a second predetermined value of said level indication indicates a low signal level in said input infrared signal, wherein said compressing includes creating a new one of said table entries responsive to detecting each signal level transition in said input infrared signal, and wherein said plurality of table entries in said table completely represent said input infrared signal by including an individual corresponding table entry for each respective individual portion of said input infrared signal;

forming a table header associated with said table, wherein said table header contains an indication of said sample rate and an indication of a total number of entries in said table;

storing said table with said associated table header in a data file;

receiving a request for playback of said input infrared signal;

opening said data file responsive to said request for playback and loading said table into a dynamic memory;

reading said table header to determine the number of entries in said table and said sample rate;

transmitting an output infrared signal equivalent to said input infrared signal responsive to said table, wherein said transmitting includes playing back said input infrared signal based on said plurality of table entries in said table until a last one of said plurality of table entries is reached; and after a last one of said entries in said table has been processed, closing said data file and freeing all associated dynamic memory.

2. The method of claim 1, further comprising:

loading said sample rate into a hardware circuit;

loading said level indication and said length value for each entry into said hardware circuit; and wherein said transmitting includes shifting one bit from a shift register in said hardware circuit each cycle of said sampling rate until all entries in said table have been processed.

3. A system for controlling diverse infrared controlled devices, comprising:

signal receiving logic operable to receive an input infrared signal from at least one infrared remote control;

signal capturing and storing logic operable to capture and store said input infrared signal in raw form by sampling said input infrared signal at a predetermined sample rate, and by storing a plurality of resulting sample values in a memory until an end of signal indication is detected;

compression logic operable to compress said sample values into a table, wherein said table includes a plurality of table entries, wherein each of said table entries includes a level indication and a length value, wherein said level indication comprises a single bit of each of said table entries and said length value comprises a plurality of remaining bits of each of said table entries, wherein said level indication indicates an associated signal level and said length value indicates a number of associated contiguous samples at said signal level within a corresponding portion of said input infrared signal, and wherein a first predetermined value of said level indication indicates a high signal level and a second predetermined value of said level indication indicates a low signal level in said input infrared signal, wherein said compressing includes creating a new one of said table entries responsive to detecting each signal level transition in said input infrared signal, and wherein said plurality of table entries in said table completely represent said input infrared signal by including an individual corresponding table entry for each respective individual portion of said input infrared signal;

table header forming logic operable to form a table header associated with said table, wherein said table header contains an indication of said sample rate and an indication of a total number of entries in said table;

table header storing logic operable to store said table with said associated table header in a data file;

request receiving logic operable to receive a request for playback of said input infrared signal;

file opening logic operable to open said data file responsive to said request for playback and loading said table into a dynamic memory;

header reading logic operable to read said table header to determine the number of entries in said table and said sample rate;

transmit logic operable to transmit an output infrared signal equivalent to said input infrared signal responsive to said table by playing back said input infrared signal based on said plurality of table entries in said table until a last one of said plurality of table entries is reached; and file closing logic operable to, after a last one of said entries in said table has been processed, close said data file and freeing all associated dynamic memory.

4. The system of claim 3, further comprising:

sample rate loading logic operable to load said sample rate into a hardware circuit;

length loading logic operable to load said level indication and said length value for each entry into said hardware circuit; and wherein said transmit logic includes shift logic operable to shift one bit from a shift register in said hardware circuit each cycle of said sampling rate until all entries in said table have been processed.

* * * * *